United States Patent [19]

Tsuya et al.

[11] Patent Number: 5,310,600

[45] Date of Patent: May 10, 1994

[54] FIBER REINFORCED POLYAMIDE RESIN COMPOSITE MATERIAL AND METHOD OF MANUFACTURE THEREOF

[75] Inventors: Kazuhide Tsuya, Gifu; Akio Onodera, Seki; Masahiko Yokokita, Gifu, all of Japan

[73] Assignee: Ube-Nitto Kasei Co., Ltd., Tokyo, Japan

[21] Appl. No.: 838,218

[22] PCT Filed: Dec. 28, 1990

[86] PCT No.: PCT/JP90/01733

§ 371 Date: Mar. 6, 1992

§ 102(e) Date: Mar. 6, 1992

[87] PCT Pub. No.: WO92/00837

PCT Pub. Date: Jan. 23, 1992

[30] Foreign Application Priority Data

Jul. 6, 1990 [JP] Japan .................. 2-179064

[51] Int. Cl.$^5$ .............................. D02G 3/00
[52] U.S. Cl. .................. 428/378; 427/289; 427/389.8; 427/393.5; 428/435; 428/475.2; 428/476.9
[58] Field of Search ........... 427/289, 221, 389.8, 427/393.5; 428/378, 435, 475.2, 476.9

[56] References Cited

U.S. PATENT DOCUMENTS

| | | | |
|---|---|---|---|
| 3,882,077 | 5/1975 | Takita et al. | 524/496 |
| 3,962,172 | 6/1976 | Wurmb et al. | 427/412.1 |

FOREIGN PATENT DOCUMENTS 56-5717  1/1981  Japan .
56-5718  1/1981  Japan .

Primary Examiner—Michael Lusignan
Attorney, Agent, or Firm—Wenderoth, Lind & Ponack

[57] ABSTRACT

A fiber reinforced polyamide resin composite material is suitable for use as a molding material. A liquid lactam added with an anionic polymerization catalyst and another liquid lactam added with an activator are supplied to an impregnation chamber while being mixed together at a predetermined or selected ratio. In the impregnation chamber, long reinforcing fibers are impregnated with the mixed liquid to form a strand. Then a coating layer of thermoplastic resin is continuously formed all over the outer peripheral surface of the strand, after which the strand is introduced into a heated polymerization chamber for anionic polymerization of the mixed liquid in the reinforcing fibers. The strand is cut into pellets of a predetermined or selected length after or without removing the coating layer. The composite material manufactured by this method has a high adhesive strength between the reinforcing fibers and the resin and provides excellent physical properties to ultimate moldings.

8 Claims, 2 Drawing Sheets

FIBER REINFORCED POLYAMIDE RESIN COMPOSITE MATERIAL AND METHOD OF MANUFACTURE THEREOF

BACKGROUND OF THE INVENTION

The present invention relates generally to a fiber reinforced polyamide resin composite material and its manufacturing method and, more particularly, to a composite material which is suitable for use in molding articles and in which an adhesion between resin and reinforcing fibers is fast or firm to provide excellent mechanical strength, and a method for manufacturing such a composite material with high productivity.

By virtue of their light weight, excellent mechanical strength, corrosion resistance and so forth, various composite materials consisting of reinforcing fibers and thermoplastic resins are widely used for manufacture of electrical parts, auto parts, etc. It is well-known in the art that the fiber reinforced resin compositions for such uses are roughly divided into two types: one is a short-fiber reinforced pellet which is obtained by mixing short glass fibers with molten thermoplastic resin in an extruder, extruding therefrom the mixture in the form of a rod and cutting it into pellets of a predetermined shape; and the other is a long-fiber reinforced pellet which is obtained by impregnating long reinforcing fibers with molten thermoplastic resin, or liquid thermoplastic resin dissolved in a solvent, and then cutting it into a predetermined length.

The short-fiber reinforced pellet is defective in that it is inferior to the long-fiber reinforced pellet with regard to reinforcement effect, because the reinforcing fibers are cut short in the pelletization step and in the extruder during injection molding. On the other hand, manufacture of the long-fiber reinforced pellet involves problems such as difficulty in the impregnation of the long reinforcing fibers with the molten thermoplastic resin or, in case of impregnation with the thermoplastic resin in the form of a solution, difficulty in removal of the solvent and insufficient bond strength between the resin and the reinforcing fibers after the removal of the solvent.

As an improved method for impregnation of the resin into the reinforcing fibers, in particular, there is disclosed in H. Ishida and G. Rotter, "RIM-pultrusion of thermoplastic matrix composite," SPI 43rd Ann. Conf., 6-E (1988) a fiber reinforced nylon-6 RIM pultrusion method according to which two low-viscosity, reactive liquid monomers are mixed in a mixing chamber and the mixture is impregnated into the reinforcing fibers.

With the method disclosed in the above-mentioned lit.:rature, however, pot life after mixing the two liquids is relatively short. This poses a problem such as a limitation on the transfer of the mixture from the mixing chamber to an impregnation chamber or unbalanced supply of the mixture to the impregnation chamber. Besides, polymerization rate is low which results in low productivity, clogging of a die in the polymerization step and an increase in drawing resistance.

The inventors herein have been devoted to studying a fiber reinforced polyamide resin composite material and its manufacturing method which are free from the above-noted problems and, as the result of their studies, they have now made the present invention.

SUMMARY OF THE INVENTION

The method of the present invention which solves the above-mentioned problems is characterized in that two liquid lactams each added with an anionic polymerization catalyst and an activator are continuously mixed and impregnated into long reinforcing fibers, and that immediately thereafter a resultant is coated with molten thermoplastic resin and introduced into a heating cell for anionic polymerization of lactams in the coating, followed by a cutting into a predetermined or selected length after removing the coating layer or without removing it.

Typical examples of lactams for use in the method of the present invention include $\gamma$-butyrolactam, $\delta$-valerolactam, $\epsilon$-caprolactam, $\omega$-enanthlactam, $\omega$-capryllactam, and $\omega$-undecanolactam. These lactams may be used alone or in combination.

Any compounds which have been used for the alkaline polymerization of known lactams can be employed as the anionic polymerization catalyst. Some specific examples are alkali metals, alkali earth metals, their hydrides, oxides hydroxides, carbonate, alkylated compounds or alkoxides, Grignard compounds, sodium naphthalene, and reaction products of the above-mentioned metal compounds and lactams such as sodium lactam, potassium lactam and lactam magnesium bromide. These anionic polymerization catalysts are added in amounts of 0.1 to 3 mol %, preferably 0.3 to 2.5 mol %, to monomer lactams liquified by heating to temperatures higher than their melting points (the mixed solution of the anionic polymerization catalyst and the lactam will hereinafter be referred to the liquid A).

It is also possible to employ as the activator any of compounds which have been used for the alkaline polymerization of known lactams. Some specific examples are N-acyl lactam, organic isocyanate, acid chlorides, acid anhydrides, ester, urea derivatives, carboimide and ketene. In practice, the kind and amount of the activator are determined taking into account a reaction initiation temperature and a pot life, and the activator is added to a liquid lactam (the mixed liquid of the activator and the lactam will hereinafter be referred to as the liquid B).

The liquids A and B are prepared in separate tanks. Incidentally, when mixing the catalyst and the activator with the liquid lactam heated to a temperature in excess of its melting point, the water content or active gas in the air may sometimes inhibit the polymerization. Hence it is desirable that the tank be held in an atmosphere of an inert gas, for example, nitrogen gas.

The liquids A and B are supplied to an impregnation chamber while being mixed together in a predetermined or selected ratio. At the same time, long reinforcing fibers such as glass fiber, carbon fiber or similar inorganic fiber, or aromatic polyamide, vinylon, polyester, aromatic polyester or similar organic fiber, are continuously passed through the impregnation chamber where the fibers are impregnated with the mixed liquid (hereinafter referred to as a reaction liquid). Incidentally, anionic polymerization of the lactam is affected by moisture; hence, hygroscopic fibers such as aromatic polyamide fiber, etc. should be kept dry before entering into the impregnation chamber. Moreover, since a binder (sizing agent) of the epoxy resin family which is generally used for the carbon fiber has a tendency to hinder anionic polymerization, it is preferable to employ, as the sizing agent, resins of the polyurethane, acrylic, polyvinyl alcohol series. The viscosity of the reaction liquid at the time of impregnation is very low because the lactam which is a monomer is in the form of a molten liquid by being heated in excess of its melting point, and consequently the reinforcing fibers can be sufficiently impregnated with the reaction liquid in a very short time. For example, in case of ε-caprolactam, it is molten by heating to around 80° C. (centigrade) as its melting point is around or higher than 69° C., and its melt viscosity is about 10 cP (centipoise) which is very low as the viscosity of the impregnation liquid. In this instance, if the temperature in the impregnation chamber is low, the ε-caprolactam will increase its viscosity or will solidify, by which the impregnation becomes insufficient or the drawing resistance becomes large, making it impossible to draw the impregnated reinforcing fibers. On the other hand, when the temperature in the impregnation chamber is too high, poor impregnation or drawing is liable to occur due to solidification of the reaction liquid by polymerization. Hence the temperature in the impregnation chamber is held at about 80° C.

The reinforcing fibers thus impregnated with the reaction liquid are then coated with a thermoplastic resin. Taking into account a temperature for the subsequent polymerization of the reaction liquid in the reinforcing fibers, the thermoplastic resin is selected from those which have a softening point above 120° C., have a resistance to the reaction liquid, permit melt extrusion and can form a barrier against gas. Polypropylene resin, polyester resin, polymetyl pentene, fluorocarbon resin, etc. are preferable in case that the coating layer is removed afterward, and polyamide resin and so forth are preferable when the coating layer remains unremoved.

In the coating step the reinforcing fibers impregnated with the reaction liquid are introduced into a nipple held at a temperature of at least around 80° C., and at the tip end side of the nipple the reinforcing fibers are continuously coated all over the peripheral surfaces thereof with the thermoplastic resin which is extruded from a coating head portion having a die of a diameter larger than a planned outer diameter of the coated fibers, the resin being drafted onto the fibers, or a diameter approximate to the planned outer diameter of the coated fibers without the resin being drafted. In case of coating the reinforcing fibers with drafting, air or the like may be removed from a conical space defined by the extruded resin between the outlet of the die and a point where the resin contacts the fibers, by simultaneously supplying an inert gas such as nitrogen gas into the space and reducing the pressure therein.

The intermediate product thus formed is, after the thermoplastic resin coating layer is cooled or without it being cooled, guided to a heated polymerization chamber where the reaction liquid in the coating layer is subjected to anionic polymerization, which can be done by holding the intermediate product in the polymerization chamber at temperatures above 120° C. for tens of minutes. This polymerization may be made immediately subsequently to the coating step or separately therefrom, in which latter case the intermediate product is stored until the polymerization step. A continuous rod-like member thus obtained is ultimately cut into pellet-like products of a predetermined or selected length after removing the coating layer or without removing it.

With the fiber reinforced polyamide resin composite material manufacturing method according to the present invention, the lactam that is used performs the anionic polymerization at a relatively low temperature and has a relatively long pot life by virtue of the addition of the activator, and the reinforcing fibers impregnated with the lactam are coated all over the outer peripheral surfaces thereof with the thermoplastic resin. Thus, the subsequent polymerization does not call for drawing the reinforcing fibers while polymerizing the impregnating resin in a die, as required in the known RIM-pultrusion process. This affords remarkable reduction of drawing resistance and eliminates the necessity of substitution with an inert gas in the polymerization atmosphere, thus permitting substantial simplification of the apparatus used and allowing great ease in handling the intermediate product. Further, since the reinforcing fibers are covered by the coating layer, it is possible to take up the intermediate product without polymerization of the impregnated resin. This permits a plurality of intermediate products to be subjected to polymerization together, and/or makes it possible to use a polymerization bath of a relatively short length by having the intermediate products pass through the bath several times with the aid of reversing rollers for satisfying a required polymerization time. Thus, the efficiency of utilization of the apparatus can be enhanced.

The fiber reinforced polyamide resin composite material of the present invention, produced by the above-described manufacturing method, has a high adhesive strength between the reinforcing fibers and the resin, and hence has an excellent characteristic as a molding material. It is particularly preferable to employ carbon fibers as reinforcing fibers sized with a sizing agent such as a resin of the polyurethane, acrylic or polyvinyl alcohol series.

The above-mentioned and other objects, features and advantages of the present invention will become apparent from the following description of embodiments of the invention taken in conjunction with the accompanying drawings.

BEST MODE FOR CARRYING OUT THE INVENTION

Figure 1:
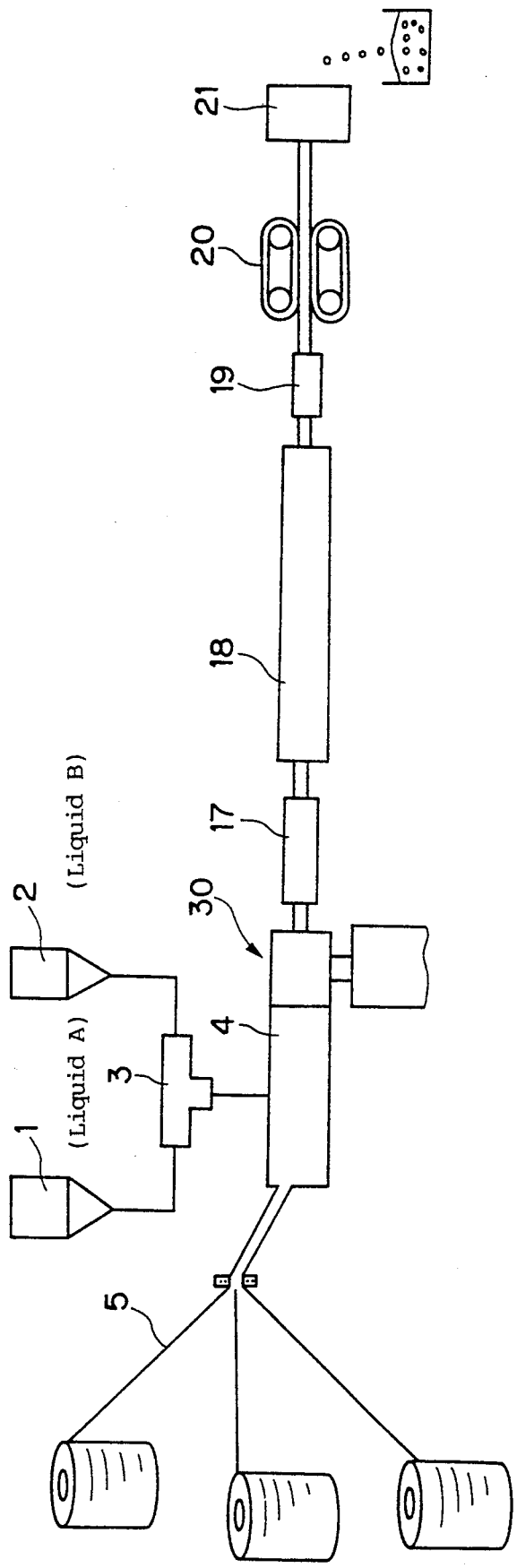
FIG. 1 is a schematic diagram of an apparatus for use in manufacture of fiber reinforced polyamide resin composite material according to an embodiment of the present invention.

The present invention will hereinafter be described with reference to preferred examples thereof.

EXAMPLE 1

A tank 1 contained a liquid A comprising ε-caprolactam as a monomer, heated to 80° C., and 1 mol % of metal Na in the form of strips added thereto as an anionic polymerization catalyst and mixed therewith. A tank 2 contained a liquid B comprising ε-caprolactam similarly heated to 80° C. and 1 mol % of N-phenylisocyanate added thereto as an activator. Under the tanks 1 and 2 is provided a mixing chamber in which the liquids A and B were mixed together at a ratio of 1:1 to produce a reaction liquid. The reaction liquid was continuously supplied to an impregnation chamber 4 connected to the bottom of the mixing chamber 3, and dried glass fiber rovings (made by Nippon Denki Glass Kabushiki Kaisha, trade mark: ER1150T-240, treated with a sizing agent of polyurethane resin) 5 were introduced into the impregnation chamber 4, wherein the mixed reaction liquid was impregnated into the glass fibers. The viscosity of the reaction liquid was 10.5 cP.

Figure 2:
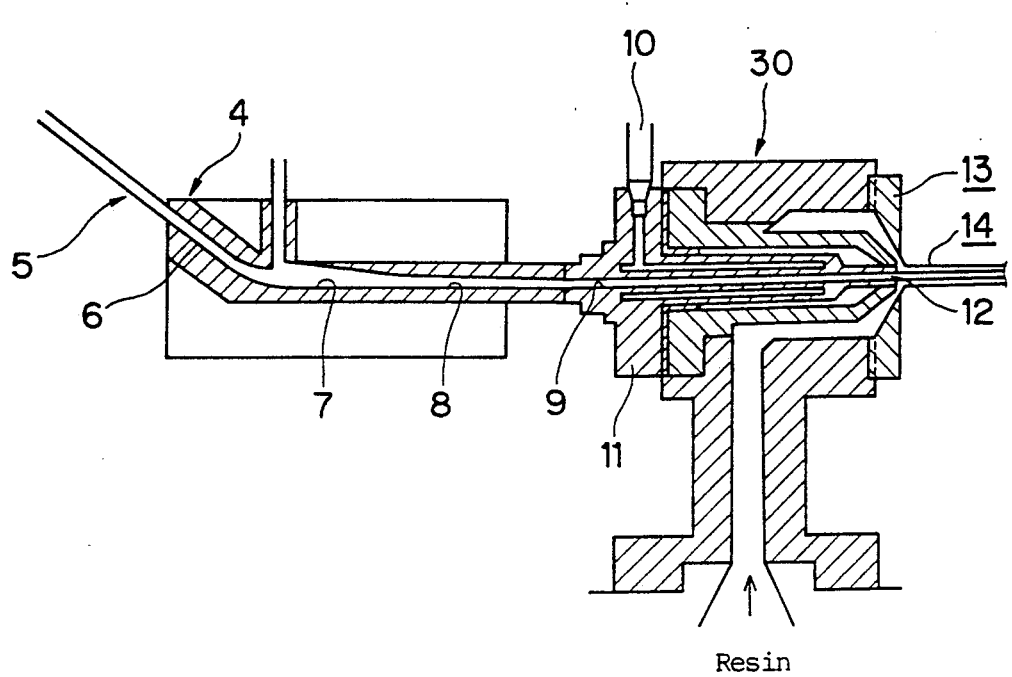
FIG. 2 is an enlarged sectional view of a portion of the apparatus depicted in FIG. 1.

The temperature around the impregnation chamber 4 was held at 80° C. and a nitrogen gas atmosphere was used in the impregnation chamber 4. The impregnation chamber 4 had a guide hole 6 having an inner diameter of 2 mm and a conical portion 7 downstream of the guide hole 6 and having a length of 500 mm with its inner diameter gradually reduced from 10 to 3 mm, the conical portion 7 being provided with a curved portion adjacent a passage connected to the mixing chamber 3 so as to prevent the reaction liquid from flowing back or dwelling (see FIG. 2).

The conical portion 7 is followed by an outlet passage 8 which is connected to a nipple 11 via a guide portion 9 having an inner diameter of 3 mm, the nipple 11 being held at 80° C. by hot water circulating through a pipe 10. The reinforcing fibers impregnated with the reaction liquid at the conical portion 7 and guided to the nipple 11, the impregnated fibers being indicated by numeral 12, were coated all over the peripheral surfaces thereof with molten fluorinated ethylene propylene resin, which was extruded without drafting at a rate of 3 m/min from a circular die 13 provided near the tip end of the nipple 11 and having an outer diameter of 6 mm and an inner diameter of 4 mm, to form a coating layer 14.

The reinforcing fibers coated with the thermoplastic resin in the above steps were immediately guided into a cooling water bath 17 (FIG. 1) to solidify the thermoplastic resin coating layer 14 by cooling. Then the reaction liquid was hardened in a polymerization bath 18 disposed immediately downstream of the cooling bath 17 and having a length of 30 m, the polymerization bath 18 being controlled so that its temperature is held between 170° and 200° C. The coated fibers were taken up onto a take-off unit 20 after passing through a water bath 19 for cooling. Thereafter, the thermoplastic resin coating layer 14 was removed by a peeling unit 21 and the glass fiber reinforced and polymerized nylon-6 strand was cut into pellets of about 10 mm length.

The composite material thus obtained was dried at 80° C. for 12 hours and supplied to an injection molding machine having a screw diameter of 16 mm and an L/D ratio of 28, by which were molded a sample piece of a size 13.5 × 120 mm and 3 mm thick (based on ASTM D-790) for a bending test and a sample piece of a size 13 × 165 mm and 2.4 mm thick of dumbbell shape (based on ASTM D-638) for a tensile test. The physical properties of these sample pieces were measured under the conditions mentioned below.

For purposes of comparison, the physical properties of a molded article using a commercially available nylon-6 resin of a 27 vol % glass fiber content (made by Ube Kohsan Kabushiki Kaisha, trade mark: UBE1015GC-9) also were measured.

*Tensile strength: The dumbbell-shaped samples were tested by a constant-rate extension type testing machine (made by Kabushiki Kaisha Shimazu Seisakusho, trade mark: Autograph TS-2000) at an extension rate of 5 mm/min, the length between gripping points of the sample piece being 115 mm.

*Flexural strength: The flexural test samples of the above-mentioned predetermined shape were tested by a constant-rate extension type testing machine (made by Minebear Kabushiki Kaisha, trade mark: TCM5000C) with a span length of 50 mm and at a loading rate of 5 mm/min.

*Flexural modulus: Computed from the slope of a load-deformation curve during the initial deformation in the above flexural strength test.

*Izod impact strength (notched): Impact test samples molded according to ASTM D-256 were tested by a testing machine made by Toyou Seiki Seisakusho, trade mark: Universal Impact Testing Machine.

The results of the tests are shown below in Table 1.

TABLE 1

|  | Examples | Comparative examples (commercially available) |
|---|---|---|
| Tensile strength (kg/mm$^2$) | 22 | 19 |
| Flexural strength (kg/mm$^2$) | 35 | 29 |
| Flexural modulus (kg/mm$^2$) | 1450 | 1200 |
| Izod impact strength (notched) (kg · cm/cm) | 31 | 15 |
| Glass fiber content (vol %) | 26 | 27 |

EXAMPLE 2

A carbon fiber reinforced nylon-6 resin strand was produced by exactly the same method as in Example 1 except that carbon fibers were used as the reinforcing fiber, and the strand was cut into pellets from which were manufactured by injection molding the same test samples as in Example 1 to measure their physical properties. Where commercially available carbon fiber rovings sized with epoxy resin were used, it was observed that the anionic polymerization of the lactam was hindered. On the other hand, where unsized carbon fibers were used, the polymerization was not hindered, but it was difficult to prevent damage of single yarns in the course of molding because the rovings were not sized, which means that use of such unsized carbon fibers was virtually impossible. In view of the above, a commercially available product (made by Sumika Hercules Kabushiki Kaisha, trade mark: Magnamite AS4) was used as the carbon fiber rovings after being sized with a resin of the polyurethane series.

For the purpose of comparison, physical properties of moldings produced by using commercially available carbon fiber reinforced polyamide resin (made by Tore Kabushiki Kaisha, trade mark: 3101T-40) of a 30 vol % carbon fiber content were also measured. The results of the tests are given below in Table 2.

TABLE 2

|  | Examples | Comparative examples (commercially available) |
|---|---|---|
| Tensile strength (kg/mm$^2$) | 25 | 23 |
| Flexural strength (kg/mm$^2$) | 35 | 33 |
| Flexural modulus (kg/mm$^2$) | 2400 | 1900 |
| Izod impact strength (notched) (kg · cm/cm) | 10 | 5 |
| Glass fiber content (vol %) | 29 | 30 |

EXAMPLE 3

Figure 3:
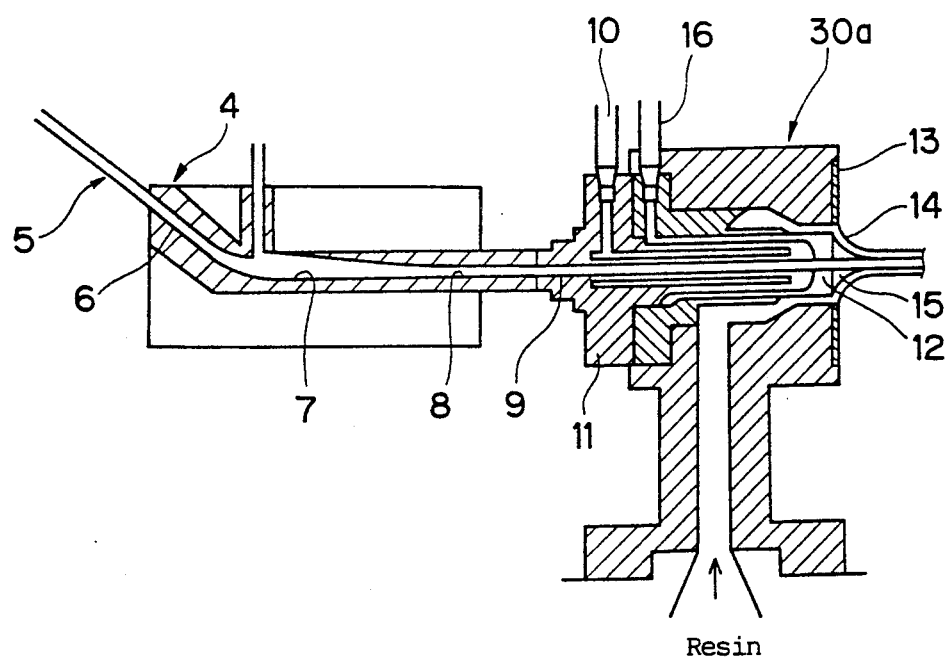
FIG. 3 is a sectional view showing a modified form of the portion shown in FIG. 2.

In this example, the die head 30 used in Example 1 (FIG. 2) was replaced with a draft-type die 30a such as shown in FIG. 3. Molten nylon-6 resin (made by Ube Kohsan Kabushiki Kaisha, trade mark: 1022B) were extruded from the circular die 13 of a 10 mm outer diameter and an 8 mm inner diameter and the lactam impregnated reinforcing fibers were coated with the resin while drafted. The method used in this example was the same as in Example 1 in other respects. The lactam impregnated in the fibers was polymerized, and then the resulting strand was pelletized. At this time, nitrogen gas was introduced from a pipe (not shown) into the internal space 15 of the coating layer 14 to provide therein a nitrogen gas atmosphere, and a pipe 16 was connected to a decompression unit to reduce the pressure in the space, by which the adhesion between the impregnated reinforcing fibers 12 and the coating layer 14 was increased.

In the pellets thus obtained, the polymerized and hardened nylon-6 resin in the reinforcing fibers and the nylon-6 resin of the coating layer closely adhered to each other and removal of the coating layer was difficult. The nylon-6 resin of the coating layer could also be used as a matrix resin and the glass fiber content of the sample pellet was reduced to 15 vol %. The pellets were used to manufacture by injection molding test samples in the same manner as in Example 1. The results of measurements of their physical properties revealed that the composite material of this Example had physical properties corresponding to the glass fiber content and could be put into practical use.

As described above, according to the manufacturing method of the present invention, the reinforcing fibers are impregnated with a reaction liquid capable of anionic polymerization and are continuously coated all over the peripheral surfaces thereof with a thermoplastic resin. This makes it possible to solve the contradictory problems involves in the prior art, namely that when the pot life of the reaction liquid is short, the polymerization time is short but many troubles are apt to occur in the impregnation step and the polymerization-pultrusion step; on the other hand, when the pot life is long, a long die is needed for polymerization-pultrusion. Thus, the method of the present invention permits fabrication of the fiber reinforced polyamide resin composite material with a simply-structured apparatus. Further, the composite material of the present invention has a high adhesive strength between the reinforcing fibers and the resin, and is therefore very useful as a molding material.

We claim:

1. A method for the manufacture of a fiber reinforced polyamide resin composite material, said method comprising the steps of:
    supplying to an impregnation chamber a liquid lactam added with an anionic polymerization catalyst and a liquid lactam added with an activator while mixing them together at a selected ratio;
    forming a strand by continuously supplying long reinforcing fibers into said impregnation chamber and therein impregnating the mixed liquid of said lactams into said reinforcing fibers;
    introducing said strand through a tubular nipple into a coating head portion of a melt extruder to form all over the peripheral surface of said strand a continuous coating layer of a thermoplastic resin extruded from said coating head portion, the thermoplastic resin having a softening point higher than 120° C.;
    introducing the thus coated strand into a polymerization chamber and therein conducting anionic polymerization of said lactams in said reinforcing fibers inside of said coating layer; and
    cutting the thus polymerized strand into a selected length.

2. A method for the manufacture of a fiber reinforced polyamide resin composite material according to claim 1, further comprising a step of removing said coating layer after said polymerization step and prior to said cutting step.

3. A method for the manufacture of a fiber reinforced polyamide resin composite material according to claim 1, wherein said coating layer forming step comprises extruding said thermoplastic resin from a die having an inner diameter larger than the outer diameter of said strand with drafting.

4. A method for the manufacture of a fiber reinforced polyamide resin composite material according to claim 3, further comprising a step of filling a space defined between said strand and said thermoplastic resin extruded from said die with an inert gas and evacuating said space.

5. A method for the manufacture of a fiber reinforced polyamide resin composite material according to claim 1, wherein said coating layer forming step comprises extruding said thermoplastic resin from a die having an inner diameter approximate to the outer diameter of said strand.

6. A fiber reinforced polyamide resin composite material manufactured by a method comprising the following steps:
    supplying to an impregnation chamber a liquid lactam added with an anionic polymerization catalyst and a liquid lactam added with an activator while mixing them together at a selected ratio;
    forming a strand by continuously supplying long reinforcing fibers into said impregnation chamber and therein impregnating the mixed liquid of said lactams into said reinforcing fibers;
    introducing said strand through a tubular nipple into a coating head portion of a melt extruder to form all over the peripheral surface of said strand a continuous coating layer of a thermoplastic resin extruded from said coating head portion, the thermoplastic resin having a softening point higher than 120° C.;
    introducing the thus coated strand into a polymerization chamber and therein conducting anionic polymerization of said lactams in said reinforcing fibers inside of said coating layer; and
    cutting the thus polymerized strand into a selected length.

7. A fiber reinforced polyamide resin composite material according to claim 6, wherein said reinforcing fibers are selected from a group consisting of glass fibers, carbon fibers, aromatic polyamide fibers, vinylon fibers, polyester fibers and aromatic polyester fibers.

8. A fiber reinforced polyamide resin composite material according to claim 7, wherein said reinforcing fibers comprises carbon fibers sized with an sizing agent selected from a group consisting of polyurethane resin, acrylic resin and polyvinyl alcohol resin.

* * * * *